United States Patent [19]

Suzuki et al.

[11] 4,360,872
[45] Nov. 23, 1982

[54] ELECTRONIC CASH REGISTER SYSTEM

[75] Inventors: Yasuo Suzuki; Nobuyoshi Sakamoto, both of Nagaokakyo, Japan

[73] Assignee: Omron Tateisi Electronics Co., Kyoto, Japan

[21] Appl. No.: 152,393

[22] Filed: May 22, 1980

[30] Foreign Application Priority Data

Jun. 15, 1979 [JP] Japan .................................. 54-76210

[51] Int. Cl.³ ............................................. G06F 15/20
[52] U.S. Cl. ..................................... 364/405; 364/900
[58] Field of Search ................. 364/404, 405, 200, 900

[56] References Cited

U.S. PATENT DOCUMENTS

| | | | |
|---|---|---|---|
| 2,528,394 | 10/1950 | Sharpless et al. | 364/405 |
| 3,914,579 | 10/1975 | Shigemori et al. | 364/405 |
| 4,138,733 | 2/1979 | Tadakuma et al. | 364/900 |
| 4,159,533 | 6/1979 | Sakurai | 364/405 |
| 4,220,991 | 9/1980 | Hamano et al. | 364/405 |
| 4,245,311 | 1/1981 | Nakamura | 364/405 |

*Primary Examiner*—Errol A. Krass
*Attorney, Agent, or Firm*—Wegner & Bretschneider

[57] ABSTRACT

An electronic cash register system having a plurality of electronic cash registers which are connected to a common bus and assignable to a plurality of operators given respective operator codes, at least one of said cash registers comprising a customer number storage means for storing customer numbers and the data relating to merchandise and corresponding to the respective customer numbers for each of the operator codes, each of said cash registers further comprising: mode setting means for setting the cash register into registration mode or a liquidation mode; input means for entering data into the cash register; means operative in the registration mode to cause the customer number storage means corresponding to an operator code to store the customer number and the corresponding merchandise data entered through the input means; and means operative in the liquidation mode to read out the stored merchandise data corresponding to a customer number from the customer number storage means so as to perform a liquidation transaction, so that any of the operator may operate any of the cash registers to perform a desired registration or liquidation transaction.

7 Claims, 15 Drawing Figures

```
┌─ ─ ─ ─ ─┐
│ STAMP   │
└─ ─ ─ ─ ─┘        7

DP1        7.00
DP2        3.00
SERV      10.00
#001A 123   01
05/19    333-9
```

```
┌─ ─ ─ ─ ─┐
│ STAMP   │
└─ ─ ─ ─ ─┘        8

PBAL      10.00
DP3        1.00
TIP        1.00
TTL       12.00
CASH      12.00
#100B124
05/19
```

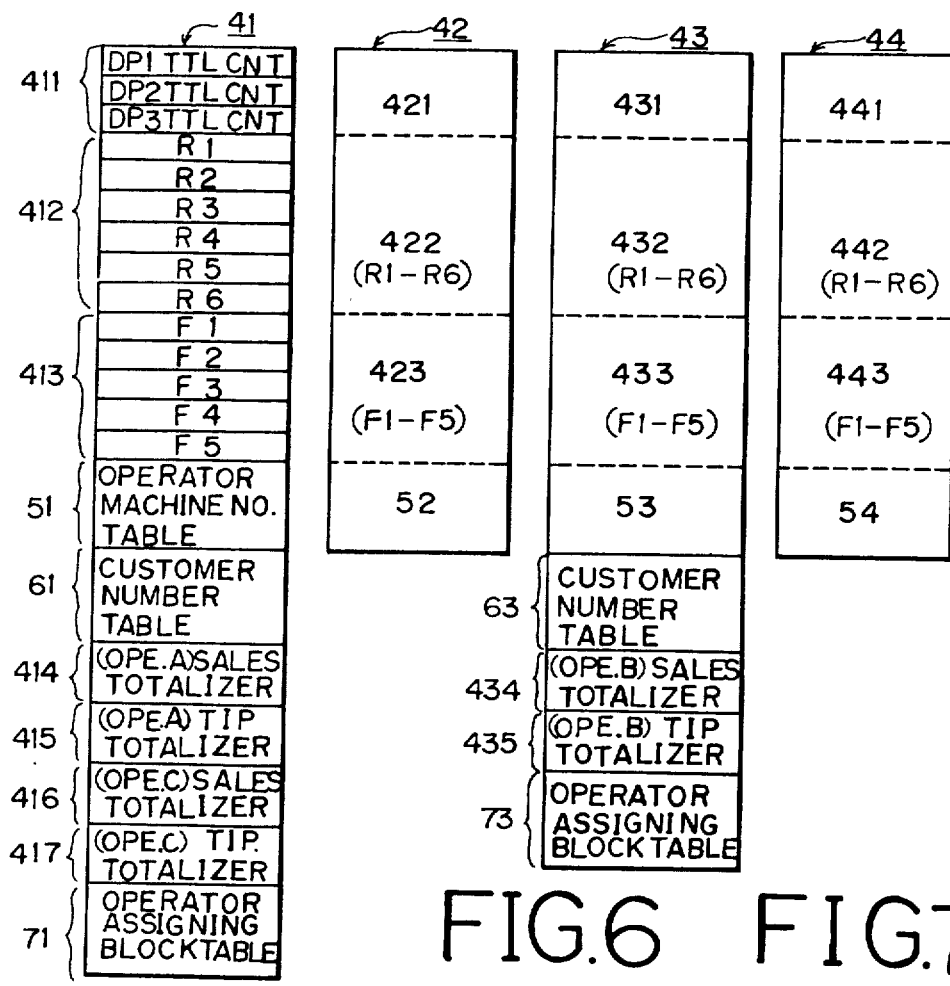
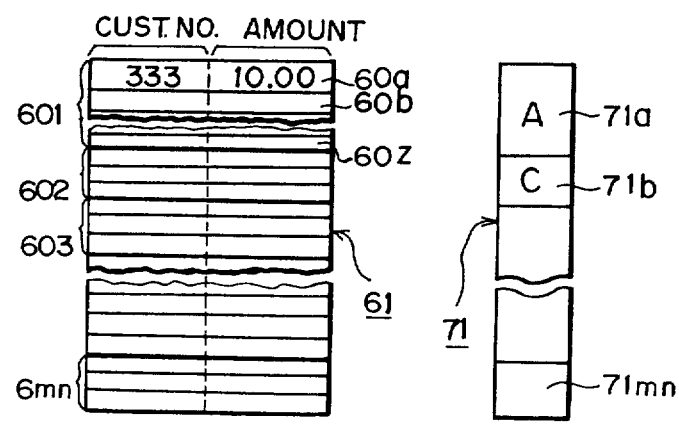
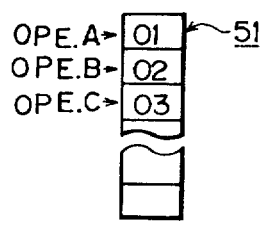

ELECTRONIC CASH REGISTER SYSTEM

BRIEF SUMMARY OF THE INVENTION

The present invention relates to an electronic cash register system having a plurality of electronic cash registers, and more particularly to an improved system wherein the plurality of electronic cash registers are connected to a common data bus so as to transmit data from one to another via the common data bus, a certain operator may operate a certain one of the electronic cash registers to register data into a predetermined cash register and another operator may operate another cash register to perform a liquidation transaction based on the data registered in the predetermined cash register.

An electronic cash register system is well known which comprises a plurality of electronic cash registers and a central processing unit coupled thereto, the central processing unit cumulatively storing sales data relating to merchandise sold to be read out for financial management after closing the shop for the day. Such a well known electronic cash register system, however, has the disadvantage that when the system is used in a restaurant, for instance, a desired liquidation transaction cannot be easily performed by a certain cash register of the system other than the cash register which has stored the data desired by a cashier.

It is, therefore, a primary object of the present invention to provide an electronic cash register system having a plurality of electronic cash registers at least one of which collectively stores desired data relating to merchandise sold, wherein the desired data may be stored into a predetermined cash register from a certain cash register and the stored desired data may be read out from the predetermined cash register into any desired cash register of the system.

It is a further object of the present invention to provide an electronic cash register system having a plurality of electronic cash registers at least one of which comprises storage means for storing customer numbers and the data relating to merchandise sold corresponding to the respective customer numbers for each of predetermined operators accessible to the system.

It is a still further object of the present invention to provide an electronic cash register system having a plurality of electronic cash registers at least one of which further comprises storage means for storing tip amount data corresponding to the respective operators.

It is another object of the present invention to provide an electronic cash register system having a plurality of electronic cash registers each of which comprises printing means for producing a printout of data relating to a customer number and a verification number on a sheet and checking means for checking if there exists a predetermined coincidence between the customer and confirmation numbers printed on the sheet so as to prevent any liquidation transaction from being unjustly performed by a false operator.

Other objects and advantages of the present invention will be apparent upon reference to the following description in conjunction with accompanying drawings, in which:

BRIEF DESCRIPTION OF DRAWINGS

FIG. 4 is an illustration showing the storage areas employed in the respective electronic cash registers of the system of FIG. 1;

FIG. 5 is an illustration showing the data stored in the operator machine number table employed in the storage areas of FIG. 4;

FIG. 6 is an illustration showing the data stored in the customer number table employed in the storage areas of FIG. 4;

FIG. 7 is an illustration showing the data stored in the operator assigning block table employed in the storage areas of FIG. 4;

DETAILED DESCRIPTION

Figure 1:
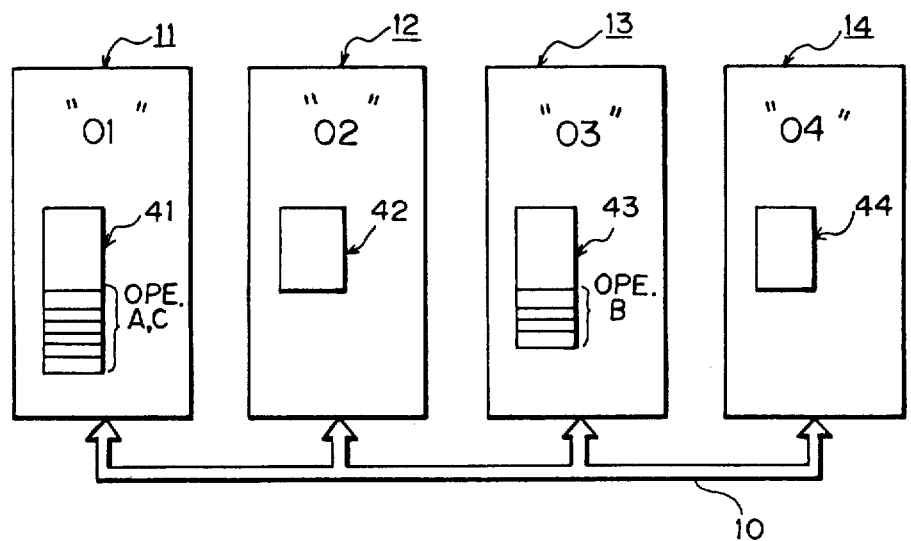
FIG. 1 is a schematic block diagram of an electronic cash register system as a preferred embodiment of the present invention.

Referring, now, to FIG. 1, there is shown a schematic block diagram of an electronic cash register system comprising four electronic cash registers 11, 12, 13 and 14 which are connected to a common data bus 10 so as to transmit data from one cash register to another, as a preferred embodiment of the present invention. The respective operator codes or numbers assigned to three operators A, B and C, for instance, are preregistered in the cash registers 11 through 14, and the three operators are authorized to use the system. The electronic cash registers 11 and 13 are designated as home machines which store the data registered by the respective operators A, B and C at respective storage areas thereof corresponding to the operator codes.

Namely, the electronic cash register (hereinafter referred to briefly as ECR) 11 is predetermined as the home machine which stores data relating to merchandise sold by the operators A and C. The ECR 11 comprises a storage unit 41 including a customer number table as a first storage means for storing customer numbers or codes inputed by the operators A and C, a tip totalizer as a second storage means for storing data relating to tips offered to the operators A and C, and a sales totalizer as a third storage means for cumulatively storing data relating to merchandise sold by the operators A and C. The ECR 13 is predetermined as the home machine which stores data relating to merchandise sold by the operator B. The ECR 13 also comprises a storage unit 43 including a customer number table for storing customer numbers or codes inputed by the operator B, a tip totalizer for storing data relating to tips offered to the operator B, and a sales totalizer for cumulatively storing data relating to merchandise sold by the operator B. The ECRs 12 and 14 have registration and liquidation functions, but have no storage means for storing the abovementioned data stored in the ECRs 11 and 13 (such as Operator Sales Totalizers, Tip Totalizers, and Operator Assigning Block Table, as shown in FIG. 4). Each of the operators A, B and C may perform registration and liquidation transactions through any one of the ECRs 11 through 14.

Figure 2:
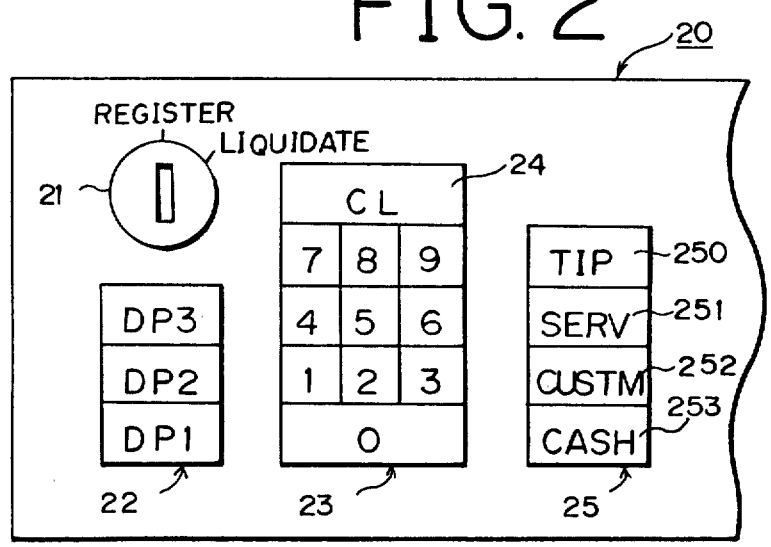
FIG. 2 is a schematic partial top plan view of the keyboard employed in each of electronic cash registers of the system illustrated in FIG. 1.

In FIG. 2, there is shown a part of the keyboard 20 employed in the ECR 11 for the convenience of illustration of the present invention. Each of the other ECRs 12, 13 and 14 also has the same keyboard as that of FIG. 2. The keyboard 20 comprises a mode select key switch 21, department keys 22, ten-entry keys 23, a clear key 24, and function keys 25.

The mode select key switch 21 is disposed as a mode setting means for setting the ECR to a registration mode, a liquidation mode or some other mode as desired, such as a power-source-off mode, a maintenance check mode or the like. In FIG. 2, however, only the registration mode and liquidation mode positions are shown for the convenience of illustration. Operator keys which are adapted to be inserted into the switch 21 have specific portions for specifying the respective operator codes of the authorized operators in the system, and are assigned to the respective operators, viz. A, B and C. If an operator inserts into the switch 21 the operator key assigned to him, his operator code is read out through the switch 21 in the ECR.

The department keys 22 are disposed to enter department codes DP1, DP2 and DP3 via department keys DP1, DP2 and DP3. In this embodiment, if one of the keys 22 is depressed, a predetermined money amount data corresponding to the depressed department key is automatically read out from a memory in the ECR.

The ten-entry keys 23 are disposed to enter the customer number which is assigned to a customer who has entered into the service domain of the system. The clear key 24 is for resetting a wrong number data that may have been entered through the ten-entry keys 23. The keys 23 also are adapted to enter other numerical data as may be desired, e.g. tip amount data.

The function keys 25 each includes a tip key 250 which is depressed when a customer has offerred a tip, a service key 251 for registering an order for merchandise or service by a customer in the system, a customer number key 252 for specifying the numerical data entered through the keys 23 as a customer number, and a cash key 253 which is depressed when a liquidation transaction should be completed.

Figures 3, 10, 11:
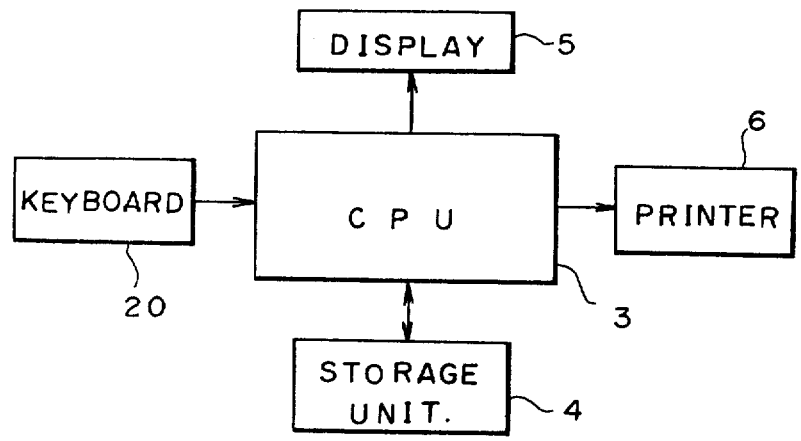
FIG. 3 is a schematic block diagram of an electronic cash register employed in the system of FIG. 1.
FIG. 10 is a pre-check receipt printed with the data relating to a registration mode.
FIG. 11 is a liquidation receipt printed with the data relating to a liquidation mode.

FIG. 3 shows a schematic diagram of each of the ECRs 11 through 14 which comprises keyboard 20, central processing unit (hereinafter referred to briefly as CPU) 3 connected to the keyboard 20 so as to receive the data entered therethrough, display 5 for displaying data from the CPU 3, printer 6 as printing means of the ECR, and storage unit 4. The ECRs 11 through 14 can be different in the construction of storage unit 4, and the respective constructions are described hereinafter in detail.

In FIG. 4, there are illustratively shown respective storage areas of the ECRs 11 through 14. Storage units 41 through 44 are disposed in the ECRs 11 through 14, respectively. The storage unit 41 comprises storage areas 411 through 417, operator machine number table 51, customer number table 61, and operator assigning block table 71. The storage area 411 includes department code areas DP1, DP2 and DP3 for storing in advance respective unit prices corresponding to the department codes, totalizers TTL for storing total amount data, and counters CNT for storing the number of registrations. The storage area 412 includes working storages R1, R2, R3, R4, R5 and R6 which are used as operational registers of the CPU 3. The storage area 413 is disposed for storing flags F1, F2, F3, F4 and F5.

The operator machine number table 51 stores the data designating the ECR which stores or manages the data relating to an operator, viz. the data showing which operator belongs to which home machine. The table 51 includes storage areas corresponding to the operators A, B and C, and the respective machine number data assigned to the ECR 11 and 13 are stored in the respective storage areas as shown in FIG. 5.

The customer number table 61 includes storage areas 601, 602, 603 . . . 6mn corresponding to the operators. In this embodiment, the areas 601, 602 and 603 correspond to the operators A, B and C, respectively. The storage area 601 is further divided into a plurality of storage line areas 60a, 60b . . . 60z corresponding to the respective customer numbers, and each line area stores the customer number assigned to a single customer and the pre-check amount data relating to the customer. The pre-check amount data means the data relating to merchandise ordered by a customer, such as a total monetary amount data in accordance with his order or other reference data based on his order. Thus, a customer number and a pre-check amount data which are registered by the operator A are stored in the storage area 601, e.g. in the storage line area 60a thereof. Other storage areas 602 . . . 6mn also include such plurality of storage line areas, respectively. A customer number and a pre-check amount data which are registered by the operator C are stored in the storage area 602. The relation of correspondence between area 601 or 602 and operator A or C in the customer number table 61 is stored in the operator assigning block table 71. In FIG. 7, there are shown the data stored in the table 71. The table 71 includes storage areas 71a, 71b, 71c . . . 71mn corresponding to the respective storage areas 601, 602, 603 . . . 6mn, respectively. In this embodiment, the storage area 71a stores the operator code of the operator A corresponding to the storage area 601, and the storage area 71b stores the operator code of the operator C corresponding to the storage area 602. The storage area 414 cumulatively stores data relating to merchandise sold by the operator A, as his sales totalizer. The storage area 415 cumulatively stores data relating to the tips offered to the operator A by customers, as his tip totalizer. The storage 416 is a sales totalizer for the operator C, and the storage 417 is a tip totalizer for the operator C.

The same storage areas as the storage areas 411, 412, 413 and 51 are disposed in the respective storage units 42, 43 and 44 of the ECRs 12, 13 and 14. Namely, the area 411 corresponds to respective areas 421, 431 and 441, the area 412 corresponds to respective areas 422, 432 and 442, the area 413 corresponds to areas 423, 433 and 443, the area 51 corresponds to areas 52, 53 and 54. The ECR 13 comprises the storage unit 43 which includes a customer number table 63 for storing customer numbers and pre-check amount data which are registered by the operator B, a sales totalizer 434 for the operator B, a tip totalizer 435 for the operator B, and an operator assigning block table 73.

Figure 8:
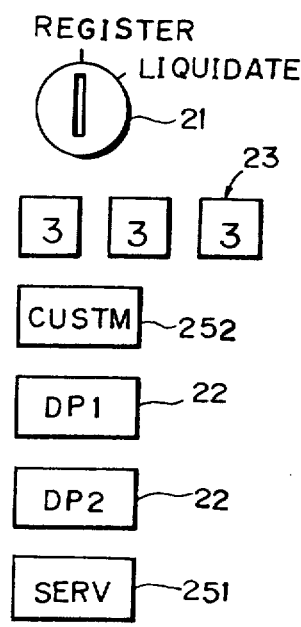
FIG. 8 is an illustration showing the operation of one of the electronic cash registers of the system of FIG. 1 in a registration mode.
Figure 9:
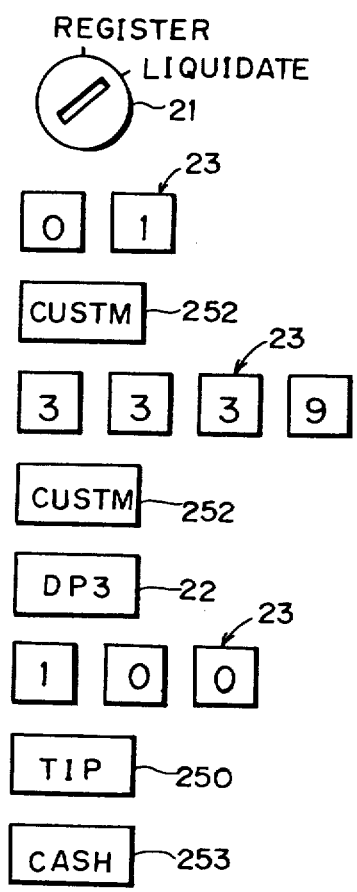
FIG. 9 is an illustration showing the operation of one of the electronic cash registers of the system of FIG. 1 in a liquidation mode.
Figure 12:
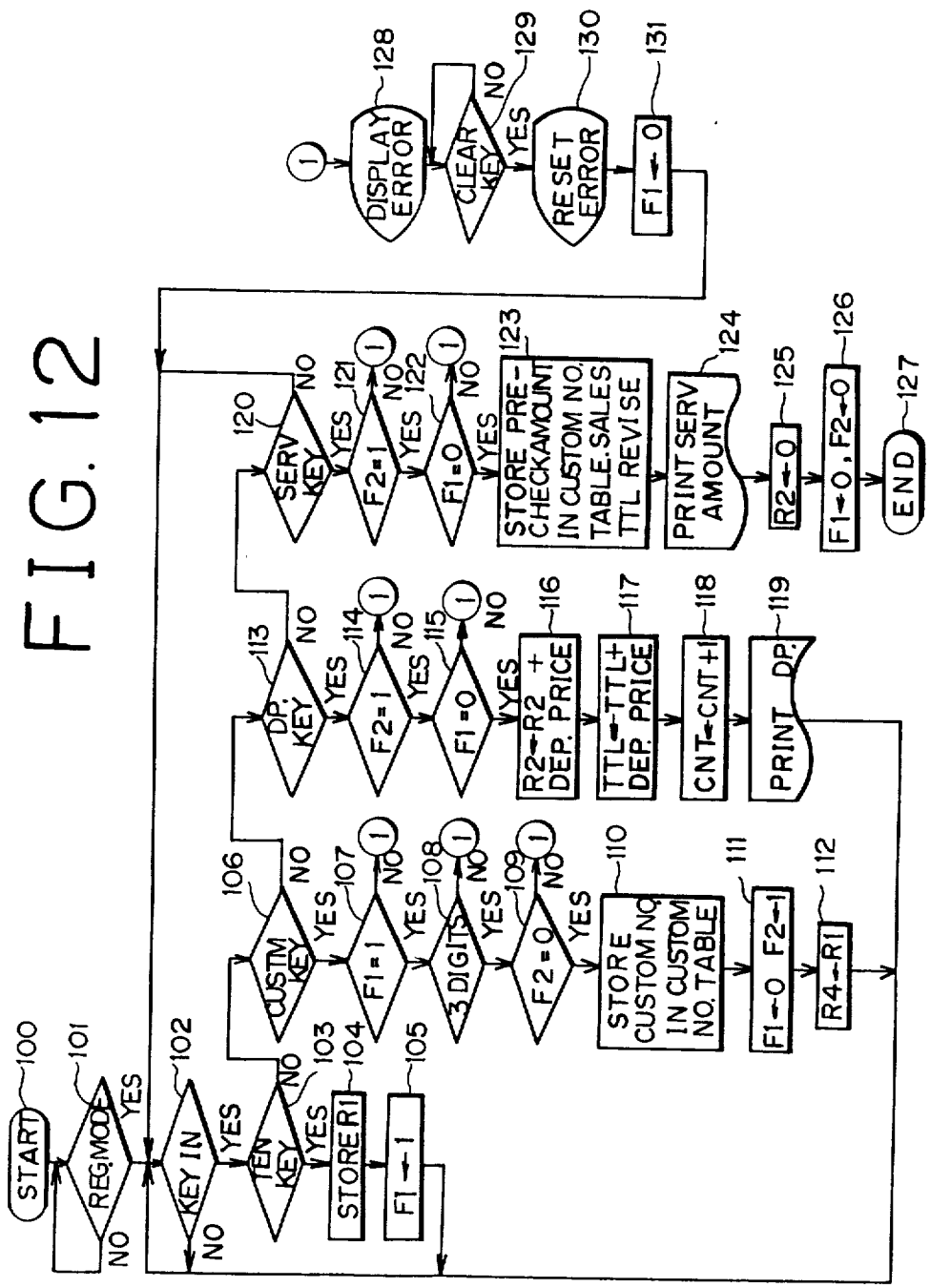
FIG. 12 is a flow chart illustrating the operation of one of electronic cash registers of the system of FIG. 1 in a registration mode.
Figure 13:
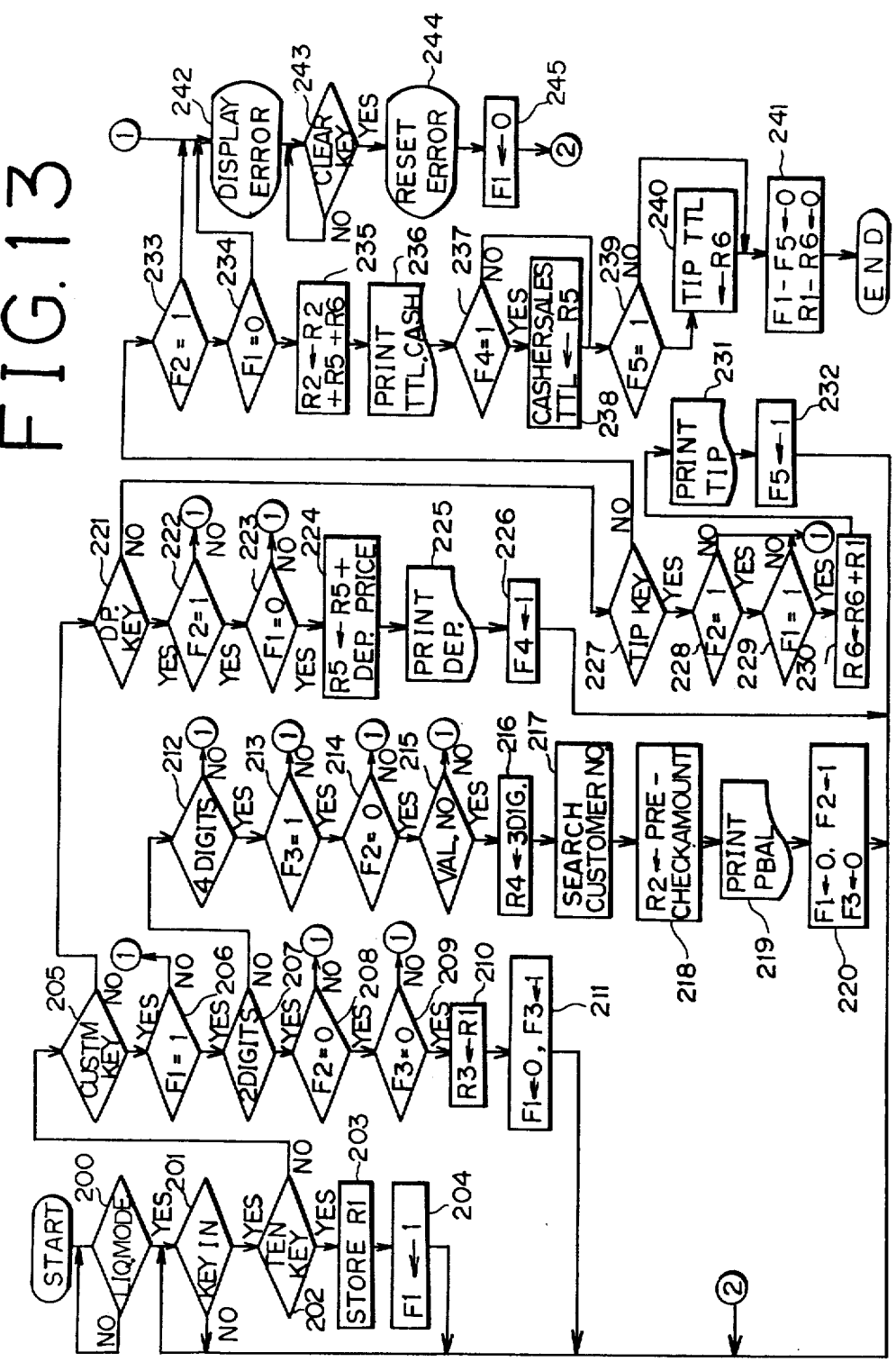
FIG. 13 is a flow chart illustrating the operation of one of the electronic cash registers of the system of FIG. 1 in a liquidation mode.

In FIG. 8, there is shown a key operation sequence which should be operated in a registration transaction. In FIG. 9, there is shown a key operation sequence which should be operated in a liquidation transaction. In FIG. 10, there is shown an example of pre-check receipt printed with data in accordance with the key operation of FIG. 8. In FIG. 11, there is shown an example of liquidation receipt printed with data in accordance with the key operation of FIG. 9. In FIG. 12, there is shown a flow chart illustrating the operations that an operator (e.g. A) should perform on an ECR (e.g. 12) in a registration transaction. In FIG. 13, there is shown a flow chart illustrating the operations that an operator (e.g. B) should perform on an ECR (e.g. 14) in a liquidation transaction.

Referring to FIGS. 1 through 8, 10 and 12, the operation in a registration mode will be described in detail, taking a practical case as an example. If a certain customer in a restaurant orders several foods or drinks to a certain operator or waiter, e.g. operator A, the operator A inserts his own key into the mode select key switch 21 of a certain ECR, e.g. ECR 12, and set the switch 21 into the registration mode. The CPU reads out the operator code of the operator A from the key inserted into the select switch 21, and at the same time detects that the registration mode has been selected (step 101 in FIG. 12). Subsequently, the operator A inputs the customer number assigned to the certain customer (e.g., 333) into the ECR 12 through the ten-entry keys 23. The customer number may be selected from a predetermined customer number list previously prepared. The CPU 3 inquires if a key input signal has been generated from the keyboard 20 (step 102), and upon a YES response from the step 102 further inquires if the key input signal is from the ten-entry keys 23 (step 103). Upon a NO response from the step 103 the CPU inquires if the key input signal is from the customer number key 252 (step 106). Upon a YES response from the step 103, the customer number "333" inputed through the ten-entry keys 23 are stored in the register R1 (step 104), a flag F1 is set (step 105), and the sequence returns to the step 102.

Then, the operator A depresses the customer number key 252 to specify the numerical data "333" entered through the ten-entry keys 23 as a customer number. Then, the CPU 3 detects that the key 252 has been depressed (step 106) and inquires if the flag F1 is set (step 107). If the flag F1 is not set, the sequence is advanced to an error processing routine consisting of steps 128 through 131. Namely, when any customer number has not been entered through the ten-entry keys 23 prior to the depression of the customer number keys 252, the CPU 3 detects the existance of an error. If the flag F1 is set, the CPU inquires whether or not the number entered via the keys 23 contains three digits (step 108). In the present embodiment, any customer number is predetermined to contain three digits, and in the step 108 any number other than three-digit numbers is judged as an error number. If the entered number contains three digits, it is inquired whether the flag F2 is set or not (step 109). If the flag F2 is set, the sequence will flow to the step 128 of the error processing routine. If the flag F2 is reset, the ECR 11 to which the operator A belongs is designated by the operator machine number table 52 in accordance with the operator code read out from the select switch 21, while the customer number "333" stored in the register R1 is stored into the customer number table 61 of the ECR 11 (step 110). Then, the flag F1 is reset and the flag F2 is set (step 111), and further the customer number "333" in the register R1 is transferred into the register R4 (step 112), so that the sequence returns to the step 102.

Then, if the order by the customer assigned with the customer number "333" corresponds to the department code DP1, the operator A depresses the department key DP1 of the keys 22. On depression of DP1, the CPU 3 detects that a key of the department keys 22 has been depressed (step 113), and inquires if the flag F2 is set (step 114). If the flag F2 is not set, the CPU 3 detects that any customer number has not been entered and advances the sequence to the step 128. If the flag F2 is set, it is inquired whether or not the flag F1 is reset (step 115). Namely, if any of the ten-entry keys 23 has been erroneously depressed just before the depression of any of the department keys 22, the sequence will flow to the step 128. If the flag F1 is reset, a single unit price (e.g. 7.00 dollars) pre-registered in the storage area 421 of the storage unit 42 corresponding to the department code DP1 is read out and is stored into the register R2 (step 116). And then, the single unit price data (7.00 dollars) is added into the totalizer TTL of the storage area 421 corresponding to the department code DP1 (step 117), and the corresponding counter CNT counts one (step 118). Subsequently, the printer 6 prints out the department code "DP1" and unit price data (7.00 dollars) on a pre-check receipt format 7 as shown in FIG. 10 (step 119).

If the customer subsequently orders a food corresponding to the department code DP2, the operator A depresses the department key DP2 of the keys 22. Then, the CPU 3, in the same manner as above, adds the single unit price (e.g. 3.00 dollars) corresponding to the department code DP2 into the register R2 so as to revise the stored data (viz. pre-check amount data) into a new pre-check amount data, viz. 10.000 dollars. And further the CPU 3 adds the unit price data (3.00 dollars) into the totalizer TTL of the storage area 421 and advances the counter CNT thereof by one count. The printer 6 also produces a print of the department code "DP2" and unit price data "3.00" dollars on the pre-check receipt 7.

Upon completion of the order by the customer, the operator A depresses the service key 251 comprised in the function keys 25. On depression of said key 251, the CPU 3 detects that the service key 251 has been depressed (step 120) and inquires if the flag F2 is set (step 121) and if the flag F1 is reset (step 122). If the flag F2 is reset or the flag F1 is set, the sequence is advanced to the step 128. If the flag F2 is set and the flag F1 is reset, the customer number "333" stored in the register R4 and the pre-check amount data "10.00" are stored into the customer number table 61 of the ECR 11, viz. the home machine of the operator A. At the same time the pre-check amount data is added into the sales totalizer 414 for the operator A (step 123). Then, the printer 6 prints the total amount data "SERV 10.00" on the receipt 7 as shown in FIG. 10. Moreover, the printer 6 prints a special number "#001A123" "01" for specifying the home machine of the operator A, date "05/19", the customer number "333", and a numeral "9" computed from the customer number "333" as a verification number (step 124). In the present embodiment, machine numbers "01", "02", "03" and "04" are preassigned to the respective ECRs 11, 12, 13 and 14, respectively (see FIG. 1), and the above-mentioned special number includes the machine number "01". After completion of such prints as shown in FIG. 10, the registers R2, F1 and F2 are subsequently reset (steps 125 and 126), and the whole sequence in the registration mode is thus completed (step 127). Then, the operator A hands over the printed pre-check receipt 7 to the customer.

When an error is detected in any of the above-mentioned respective inquiry steps, the particular sequence flows to the step 128 where an error indicator (not shown in drawings) included in the display 5 displays an error indication. Then, the operator A is informed of his mistaken key operation by such error indication, and depresses the clear key 24 (step 129). On depression of clear key 24, the CPU 3 resets such error indication in the display 5 (step 130), resets the flag F1 (step 131), and returns the sequence to the initial step 102.

The above-mentioned operations are pertinent to registration by the operator A. When the operator B operates one of the ECRs, his home machine, viz. ECR 13, stores the data registered by the operator B. Likewise, the ECR 11 stores the data registered by the operator C. Thus, even if anyone of the operators A, B and C operates any ECR of the ECRs 11 through 14 to register data relating to merchandise sold, the respective ECRs corresponding to the respective operators store the data registered by the respective operators, so that any operator may freely use any ECR to perform a desired registration.

Though in the present embodiment the operator code is read out from the key assigned to the operator, the operator code may alternatively be entered through the ten-entry keys 23 by an additional function key for specifying the entry of operation code, if desired.

Referring to FIGS. 1 to 7, 9, 11 and 13, the operation in a liquidation mode will be described in detail, taking the same practical case as above by way of example.

When the customer to whom the customer number "333" has been assigned wants to leave the restaurant after having taken foods ordered by him, he hands over the pre-check receipt 7 (shown in FIG. 10) to a cashier, viz. one of operators. Assuming that he handed over the receipt 7 to the operator B, the operator B goes to an ECR near him, e.g. ECR 14, in order to perform a predetermined liquidation transaction.

Namely, the operator B inserts his key into the mode select key switch 21 and sets the switch 21 into the liquidation mode. The CPU 3 reads out the operator code of the operator B from the inserted key, and detects that the liquidation mode has been selected (step 200).

The operator B reads the machine number "01" printed on the receipt 7, and inputs the number through the ten-entry keys 23 (step 201). In the same manner as the routine of the steps 102 to 105 of FIG. 12, the machine number "01" is stored in the register R1 and the flag F1 is set (steps 202 to 204). Subsequently, the operator B depresses the customer number key 252 in order to specify the numerical data "01" inputed through the keys 23 as a machine number. On depression of key 252, the CPU 3 detects that the flag F1 is set (step 206) and inquires if the inputed number contains two digits (step 207). A "NO" response to the step 207 is applied to an inquiry step 212 where it is inquired whether or not the inputed number contains four digits (step 212). A "YES" response to the step 207 is applied to an inquiry step 208 where it is inquired if the flag F2 is reset. An inquiry is also made if the flag F3 is reset (step 209). If the flag F2 or F3 is not reset, the CPU detects the occurence of an error and advances the particular sequence to an error processing routine having steps 242 through 245. If the flags F2 and F3 are reset, the machine number "01" stored in the register R1 is transferred to the register R3 for storage therein (step 210). Subsequently, the flag F1 is reset, the flag F3 is set, and the sequence returns to the step 201.

The operator B reads out the customer number "333" and verification number "9" from the printed pre-check receipt 7 and inputs these numbers through the ten-entry keys 23 for storage in the register R1 in the step 203. Then, the CPU 3 detects that these input numbers are made up of a total of four digits (step 212), and inquires if the flag F3 is set and if the flag F2 is reset (steps 213 and 214). If the flag F3 is reset or the flag F2 is set, the CPU 3 detects the existence of an error and advances the sequence to the step 242. If the flag F3 is set and the flag F2 is reset, the CPU 3 inquires whether or not the verification number is correct, viz. there is a predetermined relation between the verification number and the customer number. In the present embodiment, each figure of the number "333" is totalized, and an inquiry is made if the totalized number, viz. "9", is equal to the verification number. This inquiry is made so as to prevent the operator from unjustly operating the liquidation transaction. It will be understood that for the purpose of precluding false liquidation transactions, a verification number containing a large number of digits, which is hardly memorizable, or/and a more complicated predetermined relation may be employed.

If the verification number is judged as correct in the step 215, the most significant three digit number "333" of the number "3339" stored in the register R1 in the step 203 is transferred to the register R4 for storage therein (step 216). The CPU 3 searches the customer number "333" in the customer number table 61 of the ECR 11 which is designated by the machine number "01" stored in the register R3 in the step 210 (step 217). The CPU 3 further reads out the precheck amount data of 10.00 dollars corresponding to the searched customer number "333" from the customer number table 61, viz. the storage line 61a, and stores the read out data "10.00" in the register R2 (step 218). The printer 6 prints the pre-check amount data "PBAL 10.00" on a receipt 8 as shown in FIG. 11 (step 219). Further, the flags F1 and F3 are reset, the flag F2 is set, and the sequence returns to the step 201 (step 220).

If the customer who handed over the pre-check receipt 7 to the operator B makes an additional order, e.g. a cigarette, the operator B depresses the department key DP3 of the keys 22 in order to input the department code DP3 including the preset unit price corresponding to the cigarette. Upon depression of the key DP3, the CPU 3 detects that one of department keys 22 has been depressed (step 221), the flag F2 is set (step 222), and the flag F1 is reset (step 223). The CPU 3 further stores the unit price data corresponding to the department code DP3, viz. 1.00 dollar, into the register R5 (step 224). At the same time the printer 6 prints the data "DP3 1.00" on the receipt 8 to indicate that a 1.00 dollar goods belonging to the department code DP3 has been sold (step 225). Then, the flag F4 is set and the sequence returns to the step 201 (step 226).

Moreover, when the customer offers a tip of 1.00 dollar to the operator A who operated on the prior registration mode, the operator B inputs the tip data "1.00" through the ten-entry keys 23 so that it is stored in the register R1 (steps 201 to 204), and depresses the tip key 250 (step 227). The CPU 3 inquires if the flags F2 and F1 are set (steps 228 and 229), and adds the tip data stored in the register R1 into the register R6 (step 230). The printer 6 prints out the tip data "Tip 1.00" on the liquidation receipt 8 to indicate that the customer offered the tip (step 231).

Finally, the operator B depresses the cash key 253 to complete the liquidation transaction with the customer. Then, the CPU 3 detects that the flag F2 is set and the flag F1 is reset (steps 233 and 234), and sums up the pre-check amount (10.00 dollars) stored in the register R2, the amount (1.00 dollar) stored in the register R5 for the additional order and the tip amount (1.00 dollar) stored in the register R6 so that the summed-up data (12.00 dollars) is stored in the register R2 (step 235). The printer 6 prints the summed-up amount data "TTL 12.00" on the liquidation receipt 8, and further prints other related data, such as the machine number of the ECR 14, date or the like (step 236). After completion of such prints, the CPU 3 inquires if the register F4 is set (step 237).

A "YES" response to the step 237 indicates that the data relating to merchandise additionally sold in the liquidation mode by the operator B (viz. cigarette 1.00 dollar) should be stored into the sales totalizer 434 of the operator B. For this purpose, the CPU 3 which has detected that the flag F4 is set searches for the home machine corresponding to the operator B in the operator machine number table 54, and finds that it is ECR 13 (see FIG. 5). Then, the CPU 3 adds the additional order amount data, viz. 1.00 dollar for the cigarette, stored in the register R5 into the sales totalizer 434 of the operator B (step 238). A "NO" response to the step 237 indicates that the operator B made no additional registration except a liquidation transaction. Then, the CPU 3 inquires if the flag F5 is set (step 239).

A "YES" response to the step 239 indicates that a tip has been offered and the offered tip amount data must be added into the sales totalizer 415 of the operator A. For this purpose, the CPU 3 searches for the customer number "333" stored in the register R4 of the ECR 14 from the customer number table 61 of the ECR 11 designated by the machine number stored in the register R3, and finds out the storage area 601 storing the customer number "333". Further, the CPU 3 searches the operator assigning block table 71 so as to find out the operator corresponding to the storage area 601, viz. the operator A. Then, CPU 3 adds the above-mentioned tip data 1.00 dollar to the tip totalizer 415 for the operator A (step 240). Subsequently, the flags F1 through F5 and the registers R1 through R6 are reset (step 241), and the sequence in the liquidation mode is completed.

When the existence of an error is detected in any of the inquiry steps 206, 208, 209, 212 to 215, 222 and 223, 228 and 229, and 223 and 234, the sequence is switched to the step 242, and the error is thenceforth processed as in the above-described registration mode.

Thus, if a certain operator wants to perform a liquidation transaction by means of a certain ECR, he may easily perform his desired liquidation transaction based on the data relating to the foods or merchandise ordered by the customer which are read out from a predetermined cash register upon entry of the machine number and customer number. Moreover, even if the customer offers a tip to the operator who received his order in the registration mode, any cashier in the liquidation mode may find out the operator by reading out the storage area which corresponds to the operator and contains the customer number. Further, even if the customer additionally orders merchandise to the cashier in the liquidation mode, such a additional order may be registered.

Figure 14:
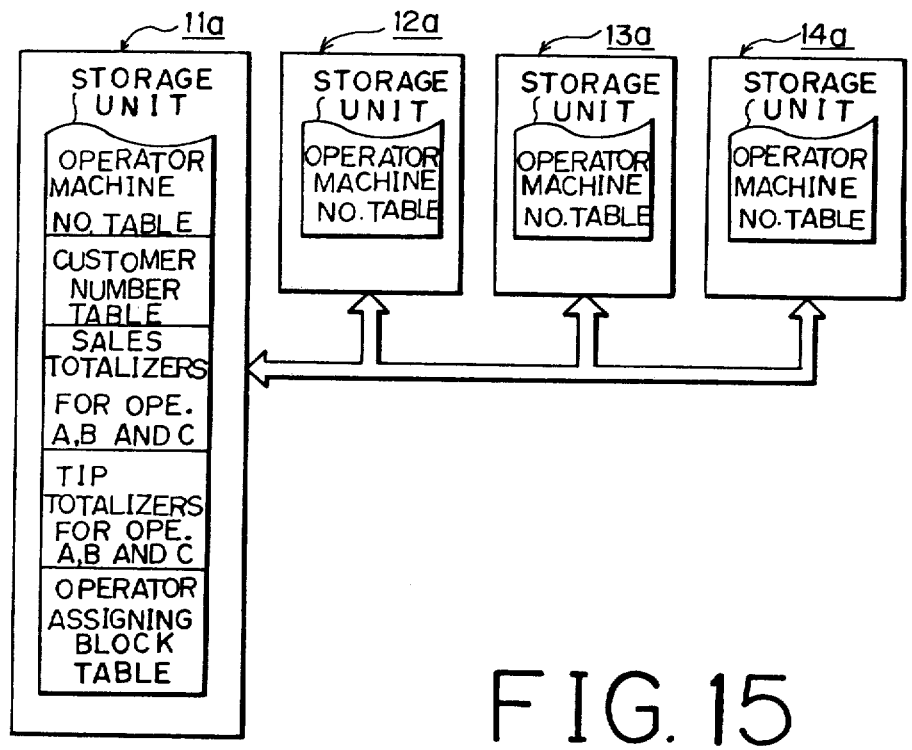
FIG. 14 is a schematic block diagram of an electronic cash register system as a modified embodiment of the present invention.

As a modified embodiment, there is shown in FIG. 14 an electronic cash register system wherein only an ECR 11a comprises a special memory including customer number tables, sales totalizers, tip totalizers and operator assigning block table for all operators A, B and C. Since such a special memory is located only in a single ECR, the system has the advantage that the system's cost is reduced as a whole.

Figure 15:
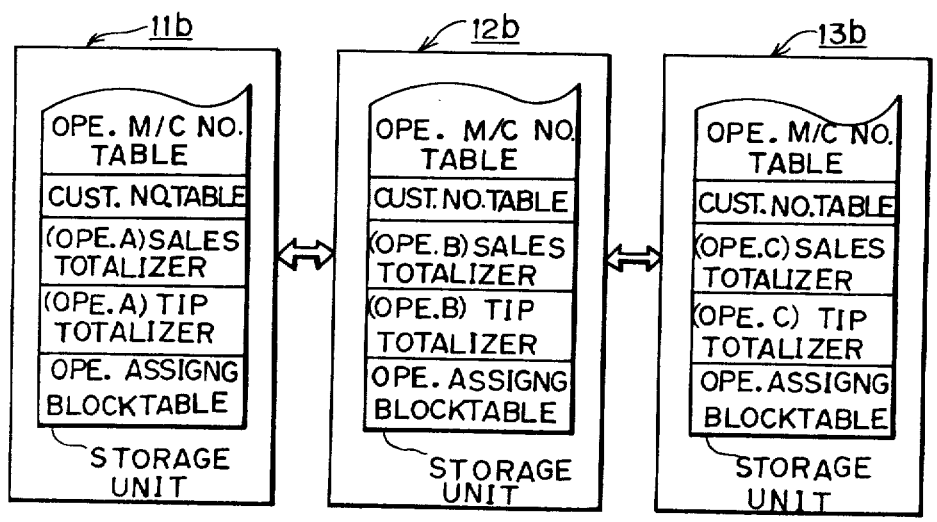
FIG. 15 is a schematic block diagram of an electronic cash register system as another modified embodiment of the present invention.

As a still another modified embodiment, there is shown in FIG. 15 an electronic cash register system wherein the respective ECRs comprise special memory portions corresponding to the respective operators A, B and C. Since, in this case, the special memory function is distributed among several ECRs, viz. ECR 11b, 12b and 13b, the system has the advantage that the data processing speed in the system is increased.

It should be understood that the above description is merely illustrative of the present invention and that many changes and modifications may be made by those skilled in the art without departing from the scope of the appended claims.

What is claimed is:

1. An electronic cash register system having a plurality of electronic cash registers which are connected to a common data bus so as to transmit data from one cash register to another and assignable to a plurality of operators given respective operator codes,
    at least one of said cash registers comprising a first storage means for storing customer numbers and the data relating to merchandise sold and corresponding to the respective customer numbers for each of the operator codes,
    each of said cash registers being a self contained unit, each having its own central processing unit and each of said cash registers further comprising:
    (a) mode setting means for setting the cash register into a registration mode or a liquidation mode,
    (b) input means for entering data into the cash register,
    (c) means operative on setting of the cash register to the registration mode and further on entry of an operator code, a customer number and data relating to merchandise sold through said input means to cause said first storage means corresponding to the operator code so entered to store said entered customer number and data relating to merchandise, and
    (d) means operative on setting of the cash register to the liquidation mode and further on entry of a particular customer number which has been stored in said first storage means to read out the data relating to merchandise corresponding to said particular customer number from said storage means so as to perform a liquidation transaction.

2. An electronic cash register system according to claim 1, wherein each cash register further comprises printing means for producing a print of data comprising a customer number and a verification number based on said customer number and means operative on existence of a predetermined relation between said customer and verification numbers to allow the cash register to proceed with a liquidation transaction therein.

3. An electronic cash register system according to claim 1, wherein each of said plurality of each cash register, further comprises operator machine number storage means for designating a cash register corresponding to an operator code.

4. An electronic cash register system according to claim 1, wherein only one of said plurality of cash registers comprises said first storage means.

5. An electronic cash register system according to claim 1, wherein each of said plurality of cash registers comprises said first storage means.

6. An electronic cash register system according to claim 1, wherein the cash register comprising said first storage means further comprises a third storage means for cumulatively storing data relating to merchandise sold and corresponding to the operators, said cumulatively stored data being revised whenever merchandise has been sold.

7. An electronic cash register system having a plurality of electronic cash registers which are connected to a common data bus so as to transmit data from one cash register to another and assignable to a plurality of operators given respective operator codes, at least one of said cash registers comprising a first storage means for storing customer numbers and the data relating to merchandise sold and corresponding to the respective customer numbers for each of the operator codes, and a second storage means for storing tip amount data corresponding to the respective operator, each of said cash registers further comprising:

(a) mode setting means for setting the cash register into a registration mode or a liquidation mode, (b) input means for entering data into the cash register, and having tip entry means including a tip designation key, said tip entry means being operative on setting the cash register to the liquidation mode and further on entry of said particular customer number and depression of said tip designation key to read out the operator code corresponding to said particular customer number from said first storage means and cause said second storage means corresponding to said read-out operator code to store tip amount data entered through said input means, (c) means operative on setting of the cash register to the registration mode and further on entry of an operator code, a customer number and data relating to merchandise sold through said input means to cause said first storage means corresponding to the operator code so entered to store said entered customer number and data relating to merchandise, and (d) means operative on setting of the cash register to the liquidation mode and further on entry of a particular customer number which has been stored in said first storage means to read out the data relating to merchandise corresponding to said particular customer number from said storage means so as to perform a liquidation transaction.

* * * * *